(12) United States Patent
Hoffmann et al.

(10) Patent No.: US 7,453,253 B2
(45) Date of Patent: Nov. 18, 2008

(54) LOCATING DEVICE AND CORRESPONDING METHOD

(75) Inventors: Erhard Hoffmann, Altenriet (DE); Stefan Clauss, Leinfelden-Echterdingen (DE); Uwe Skultety-Betz, Leinfelden-Echterdingen (DE); Bjoern Haase, Stuttgart (DE); Ulli Hoffmann, Nieffern-Oeschelbronn (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/471,247

(22) PCT Filed: Nov. 15, 2002

(86) PCT No.: PCT/DE02/04234

§ 371 (c)(1),
(2), (4) Date: Sep. 10, 2003

(87) PCT Pub. No.: WO03/067284

PCT Pub. Date: Aug. 14, 2003

(65) Prior Publication Data

US 2004/0107017 A1   Jun. 3, 2004

(30) Foreign Application Priority Data

Feb. 7, 2002   (DE) ................. 102 02 002

(51) Int. Cl.
*G01R 19/00* (2006.01)
(52) U.S. Cl. ........................... 324/67
(58) Field of Classification Search ............... 324/67, 324/156, 326, 133, 529, 530, 556, 157, 66, 324/228, 226, 329, 662, 663, 671, 672
See application file for complete search history.

(56) References Cited

U.S. PATENT DOCUMENTS

| 3,893,025 | A | * | 7/1975 | Humphreys, Jr. ........... 324/326 |
| 4,853,617 | A |   | 8/1989 | Douglas |
| 5,148,108 | A |   | 9/1992 | Dufour |
| 5,959,451 | A |   | 9/1999 | De Torfino |
| 6,211,662 | B1 |  | 4/2001 | Yim |
| 6,259,241 | B1 |  | 7/2001 | Krantz |
| 6,894,508 | B2 | * | 5/2005 | Sanoner et al. ............. 324/662 |

FOREIGN PATENT DOCUMENTS

GB    2 363 462 A    12/2001

OTHER PUBLICATIONS

Sensors & Software Inv. Pulseekko IV, User's Guide, Version 3.1, Technical Manual 17, 1992, pp. 14-40 (In English).
Daniels, D.J. Surface Pentrating Radar, London IEE Radar, Sonar and Avionics Seriesm Band 6, 1996, pp. 261-295 (in English).
Sandmeier: Reflex Manual, Version 3.1, 1996, pp. 217-224 (With English Translation).
Bruschini, C.: "Metal Detector in Civil Engineering . . . ", Nov. 20, 1998, pp. 1-20 (in English).

(Continued)

*Primary Examiner*—Reena Aurora
(74) *Attorney, Agent, or Firm*—Michael J. Striker

(57) ABSTRACT

The present invention relates to a method for graphically displaying a sectional image of an object under examination (1, 18) having objects (2, 17) situated therein, in particular for the display of a sectional image of a building wall. The invention provides that the sectional image with the objects (2, 17) situated in the object under examination (1, 18) is displayed already while data acquisition by the position detector (3, 19) is taking place.

23 Claims, 3 Drawing Sheets

OTHER PUBLICATIONS

Jean Daniel Nicoud: "GPR and Metal Detector Portable System" Symposium on Technology and the Mine Problem, Online, Nov. 18-20, 1996, enclosed.

Lockwood et al: "Bomb Detection Using . . . " Sensors, C3I. Information, and Training Technologies for Law Enforcement, Boston, MA, USA, Nov. 3-5, 1998. BD. 3577, pp. 53-61, enclosed.

* cited by examiner

LOCATING DEVICE AND CORRESPONDING METHOD

BACKGROUND OF THE INVENTION

The present invention relates to a method for graphically displaying a sectional image through an object under examination having objects situated therein, in particular for the display of a sectional image through a building wall having obstacles situated therein, and a position finder that is designed accordingly.

In detecting the location of objects in a building wall, various possibilities for displaying the result of the location detection are known.

The simplest possibility provides only a light-emitting diode and/or a buzzer for indicating the result of the location detection, whereby a warning signal is sounded when the result measured by a position detector exceeds a threshold value. This method for indicating the result of the location detection only enables a statement to be made about possible obstacles in the current position of the position detector, however. Moreover, the operator receives no quantitative information about the maximum possible drilling depth. Instead, he only receives qualitative information as to whether or not an object is even located beneath the position detector.

It is further known that pointing devices, bar displays and/or buzzers with variable pitch may be used to indicate the result of the location detection, whereby the depth of an object located in a building wall determines the deflection of the pointer or bar, or the pitch. The operator is therefore also provided with quantitative information about the depth of a located object. In this case as well, however, the display of the result of the location detection only enables a statement about the permissible drilling depth at the current position of the position detector.

In addition, a graphic display of the result of the location detection on an LCD screen is known from the NJJ-85A position finder marketed by the Japanese company JRC Radio Corporation. In this case, the position finder sends a signal into the building wall and the signal is reflected by objects located therein. The depth of the located object can be calculated based on the delay time of the reflected signal after emission until it is received by the position finder. After a line section is measured out on the building wall, the amplitude of the reflected signal is depicted graphically as a function of the delay time and the position on the line section. The operator can then identify objects in the building wall based on maximum amplitudes that stand out from the rest, and he can calculate the depth of the objects based on the delay time. This method of displaying results requires a considerable amount of experience in identifying objects and subsequently calculating the depth of the objects, however.

Finally, a method for graphically displaying the results of a location detection is known from the HILTI Ferroscan locating device. With this device, the area of interest on the building wall is scanned in eight consecutive linear line sections measuring 60 cm each, and the position result of the individual linear scans is stored. After the scan is performed in two dimensions, a quasi-transparent view of the interior of the wall is displayed on an LCD screen. The depth of each individual location must be queried separately. The operator does not receive any information about any objects at the current position of the position detector while he is performing the scanning function with the position detector, however. Instead, the operator must first generate the required position data in a complex procedure.

SUMMARY OF THE INVENTION

The present invention therefore provides a method for graphically displaying a result of a location detection and a position finder that is designed accordingly, with which a current sectional image through the building wall is displayed during the scanning function itself.

The invention is not limited to the location detection of fixed objects such as water pipes, concrete reinforcements or electrical leads in a building wall, however. Rather, the invention is also suited in general for detecting the location of any objects in an object under examination. The term "object" is therefore intended to be understood as a general term in the context of the invention. It also includes cavities and moisture pockets, for example.

A depth scale is preferably included in the sectional image through the object under examination, so that the operator can identify the depth of a located object immediately without having to perform complex calculations.

It is preferable for the unit of measure of the depth scale to be adjustable and for it to be included in the sectional image for the operator's information.

In the preferred embodiment, the located objects are displayed in the form of standardized symbols or graphic patterns, which advantageously results in a clear, understandable display.

In a variant of the invention it is further provided that the located objects are depicted graphically different in the sectional image depending on their depth. For example, the located objects can be displayed in the image section in different colors, shapes, shades and/or sizes, depending on their depth. The objects close to the surface are preferably shown in red, while the objects further from the surface and less at risk are shown in green or blue.

A further possibility for graphically differentiating the located objects depending on their particular depth is to display the located objects that are within a certain depth as blinking in order to draw the operator's attention to them. The blinking frequency of the depicted objects can increase as the depth of the objects decreases, in order to bring particular attention to objects that are close to the surface and, therefore, particularly at risk.

Furthermore, a variant of the invention also provides an acoustic signal generator that emits a warning signal in certain cases. This can be desirable, for example, when the depth of a located object is within a specified value range about which the operator should be alerted in particular. An acoustic warning signal of this type is usually emitted only when objects close to the surface are located that are particularly at risk. The value range can be stored permanently in the position finder, and/or it can be designed to be adjustable by an operator.

Preferably, the surface of the object under examination is also depicted in the sectional image in order to permit rapid orientation by the operator in the image section. When a flat building wall is being scanned, a simple line can be displayed for this purpose.

Within the framework of the invention, it is preferable to also include markings in the sectional image that represent the current position of the position detector and/or the edges of the housing of the position detector. In this manner, it is possible to easily match the object positions displayed in the image section with the actual positions of the objects in the building wall.

The same purpose is served by the ability that is possible within the framework of the invention to include a graphic display of the current position of the position detector.

In the preferred embodiment of the invention, the displayed objects, the depiction of the surface of the object under examination, the depth scale and/or the unit of measure of the depth scale are displayed in the sectional image in fixed positions, while the position detector moves during the scanning function and is therefore displayed in the sectional image as well, always in its current position.

The position data provided by the position detector usually enable a statement only about an individual point on the surface of the building wall. The position detector is therefore preferably moved linearly over a line section on the surface of the building wall, in order to pick up the desired sectional image. To identify the area of the sectional image that has not yet been scanned, a variant of the invention provides that the area of the sectional image that has already been scanned is depicted graphically differently.

A possibility for a graphic differentiation of this type is to show the previously scanned region of the sectional image in white and the region of the sectional image that has not yet been scanned in gray.

Preferably, the depicted image section is updated continually or at specified time intervals during the scanning function, so that the sectional image that is displayed always corresponds to the current position of the position detector.

Within the framework of the invention it is further possible to include additional information about the operating state of the position finder in the image section or to display it next to the image section.

It was mentioned hereinabove that, with the position finder according to the invention, the sectional image through the object to be examined is displayed already while the location detection procedure is being carried out. To accomplish this, the position detector in the position finder according to the invention is connected via an evaluation unit with a graphic display unit, and the connection is a real-time connection that permits a current display of the result of the location detection The term "real-time connection", within the framework of the invention, is not limited to connections with which a time delay does not occur between the detection of the position signals and their depiction on the display unit, since signal transmission paths experience delay, in principle, due to response time. The team "real-time connection", within the framework of the invention, therefore includes connections with which the time delay between detection of the position signals by the position detector and their depiction on the display unit is so small that the image on the display unit essentially reflects a sectional image through the object under examination at the current position of the position detector.

Preferably, the sectional image depicted by the display unit of the position finder contains a graphic reproduction of the current position of the position detector, the current position of the center line of the position detector and/or the current position of an outer line of the position detector. This advantageously makes it easier for the operator to find his special orientation in the sectional image that is displayed For the same purpose, the sectional image that is displayed preferably contains a graphic depiction of a surface of the object under examination, a depth scale, the unit of measure of the depth scale, and/or objects located in the object to be examined.

Preferably, specified graphic patterns are provided to depict objects in the sectional image. The objects are therefore not depicted in the sectional image in accordance with their signal patterns that were actually measured, but in idealized form in accordance with the graphic patterns or symbols. This advantageously makes the depicted sectional image clearer and more understandable. The graphic patterns can be stored in a memory located in the position finder or in a memory located outside the position finder, whereby the memory located outside the position finder could be connected with the position finder via a radio interface, for example.

The display unit is preferably an LED display, an LCD display, a cathode ray tube, a plasma display, a VFD display, or an OLED display, although the invention can also be realized with other types of display units.

Furthermore, an additional acoustic and/or optical signal generator is provided, in order to generate an indication signal.

Finally, it should be mentioned that the invention is not limited to certain location detection methods.

BRIEF DESCRIPTION OF THE DRAWINGS

Other advantageous further developments of the invention are characterized in the dependent claims or they are explained in greater detail hereinbelow together with the description of the preferred embodiment of the invention, with reference to the figures.

DETAILED DESCRIPTION OF THE PREFERRED EMBODIMENTS

Figure 1:
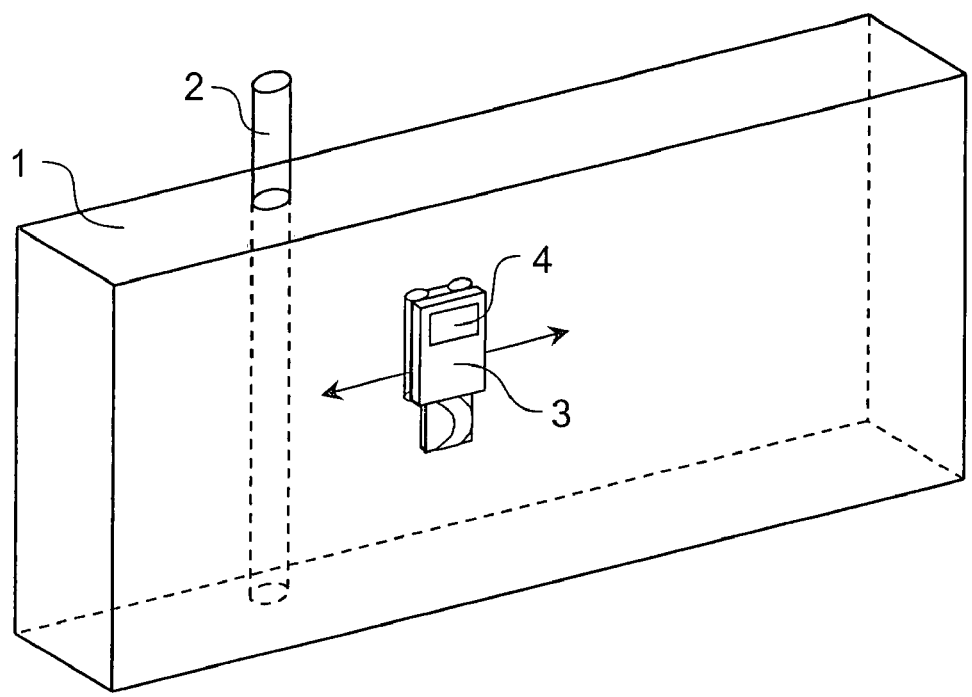
FIG. 1 is a perspective view of a building wall and a position finder according to the invention.

The perspective illustration in FIG. 1 shows a building wall 1 with a water pipe 2 that can be located using a position finder 3 according to the invention in order to prevent damage to the water pipe 2 by drilling in the building wall 1.

Figure 2A:
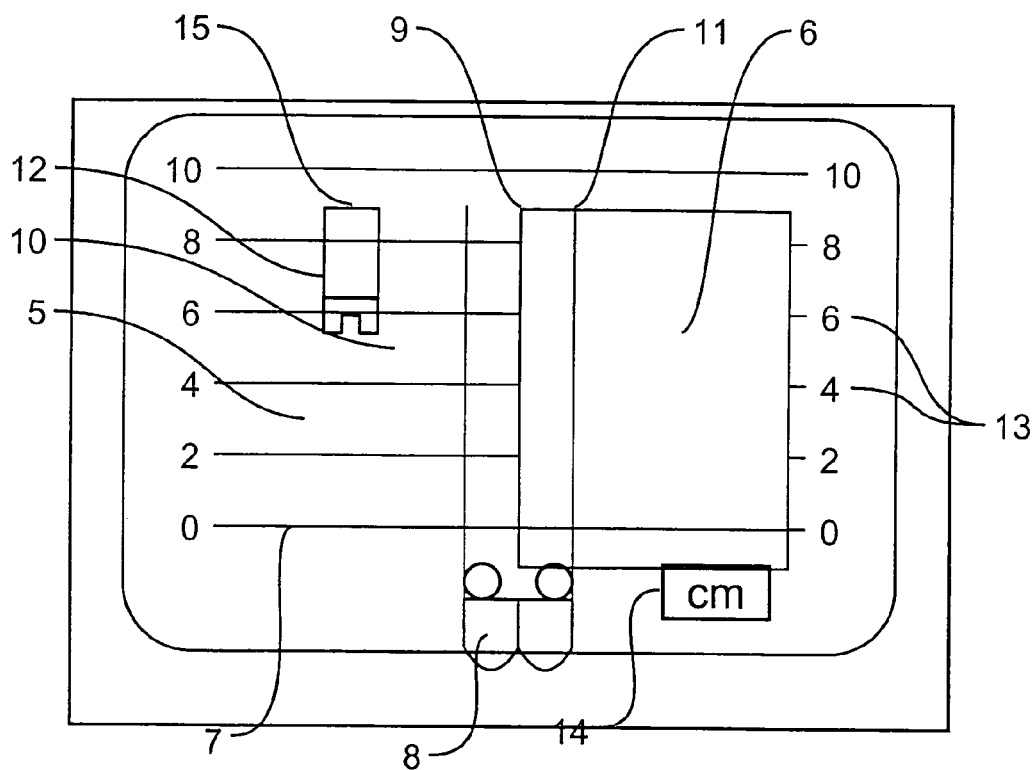
FIGS. 2a, 2b are various sectional images of the building wall that were generated using the method according to the invention.
Figure 2B:
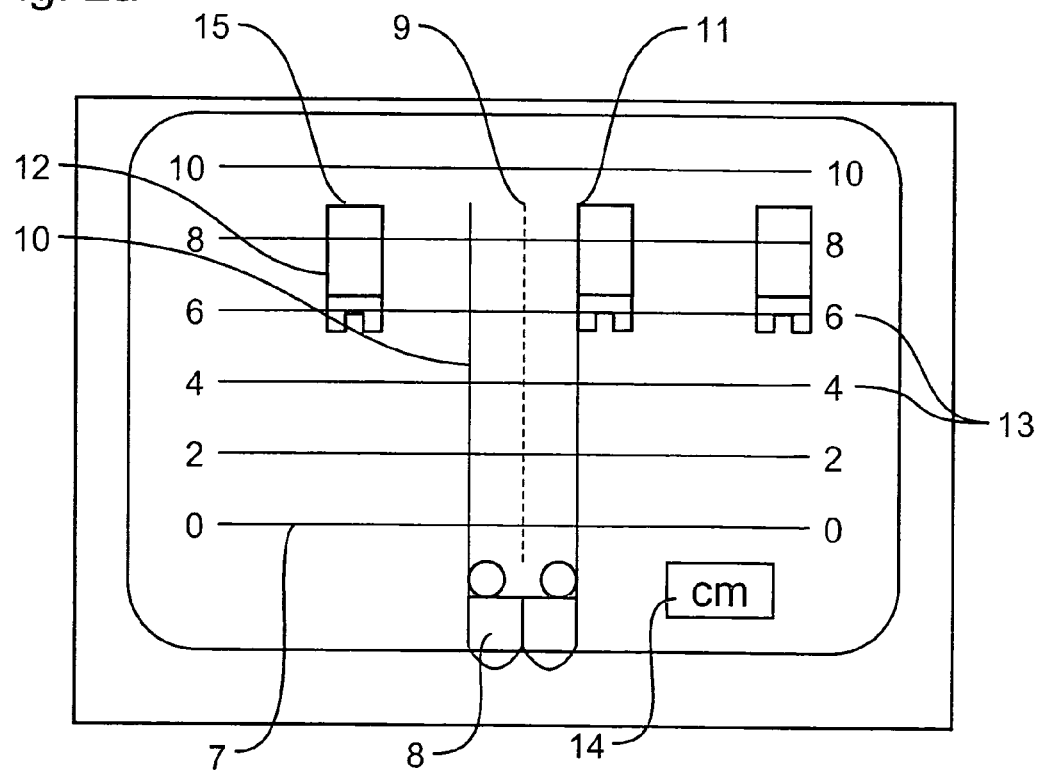

To accomplish this, the position finder 3 is guided in linear tracks over the surface of the building wall 1, each linear track generating a sectional image of the building wall 1, as shown in FIGS. 2a and 2b.

The location detection method used by the position finder 3 is based on the response-time measurement of a signal from the position finder 3 that is penetrating the building wall 1 and is reflected on the water pipe 2. Location detection methods of this type are known in general, so a detained description of the location detection method will not be provided hereinbelow.

To display the result of the location detection, the position finder 3 has an integrated LCD screen 4 on which the sectional images shown in FIGS. 2a and 2b are displayed.

The sectional images are displayed already while the individual line sections are being scanned, and it is updated continually, so that the sectional image shown on the LCD screen 4 corresponds to the current position of the position finder 3 at all times. This makes it easier for the operator to match the position of the objects inside the sectional image with the actual position of the object located in the building wall 1.

It shall now be explained with reference to FIGS. 2a and 2b how the sectional images are depicted on the LCD screen 4 of the position finder 3.

FIG. 2a shows a sectional image through the building wall 1 during the process of scanning a line section on the building wall 1 when a region 5 on the line section has already been scanned and a further region 6 on the line section has not yet been scanned. The two regions 5, 6 of the sectional image are therefore depicted graphically differently in order to inform the operator about the progress of the scanning procedure and the current position of the position finder 3 on the line section. The region S that has already been scanned is shown in white, and the region 6 that has not yet been scanned is shown in gray.

Furthermore, the surface of the building wall 1 is displayed at the bottom of the sectional image in the form of a baseline 7, which makes it easier for the operator to find his orientation within the sectional image.

This is enhanced by the inclusion of a graphic symbol 8 for the position finder 3. The graphic symbol 8 is always displayed in the center. In the example of a sectional image shown in FIG. 2a, a graphic symbol 12 of a detected object is displayed in the LCD screen 4 in the position that corresponds to its position in the building wall 1 relative to the position finder 3. As an example, FIG. 2a shows an object located to the left of the position finder 3. If the position finder 3 is moved to the left, the graphic symbol 12 moves in the LCD screen 4 in the direction of the graphic symbol 8 of the position finder 3. If the graphic symbol 12 of the object is located directly above the graphic symbol 3 of the position finder 3, the position finder 3 is located directly over the object, and the position of the object can be determined unequivocally using a marking notch—that is not shown in greater detail—on the position finder 3.

Furthermore, a centerline 9 that corresponds to the center of the position finder 3 is displayed in the sectional image in order to permit an exact determination of the position of an object in the building wall 1.

Outer lines 10 that depict the lateral edges of the housing of the position finder 3 are displayed for the same purpose.

The objects detected by the position finder 3, such as the water pipe 2, are displayed in the sectional image in the form of standardized graphic symbols 12. The graphic symbols 12 are situated correctly in the sectional image in accordance with their actual position in the building wall 1. A depth scale 13 is included at the side in the sectional image to simplify spatial orientation. This enables the operator to read the depth of the located objects or a drilling depth derived therefrom immediately and without having to perform complex calculations, by referring to the graphic symbols 12.

The position finder 3 according to the invention is suited to detecting the location of objects at various depth ranges, so an additional display 14 is included in the sectional image that indicates the unit of measure of the depth scale 13.

It using this principle of location detection, the wall areas behind the located objects are shaded by said objects, making it impossible to determine the position of other objects that may be located there, said shaded areas are shown as gray surfaces 15 in the sectional image, as is the region 6 that has not yet been scanned.

Finally, FIG. 2b shows a finished sectional image after the position finder 3 has traversed one complete line section. The entire image section is therefore displayed in white to show that the scanning of the depicted sectional image is complete.

Figure 3:
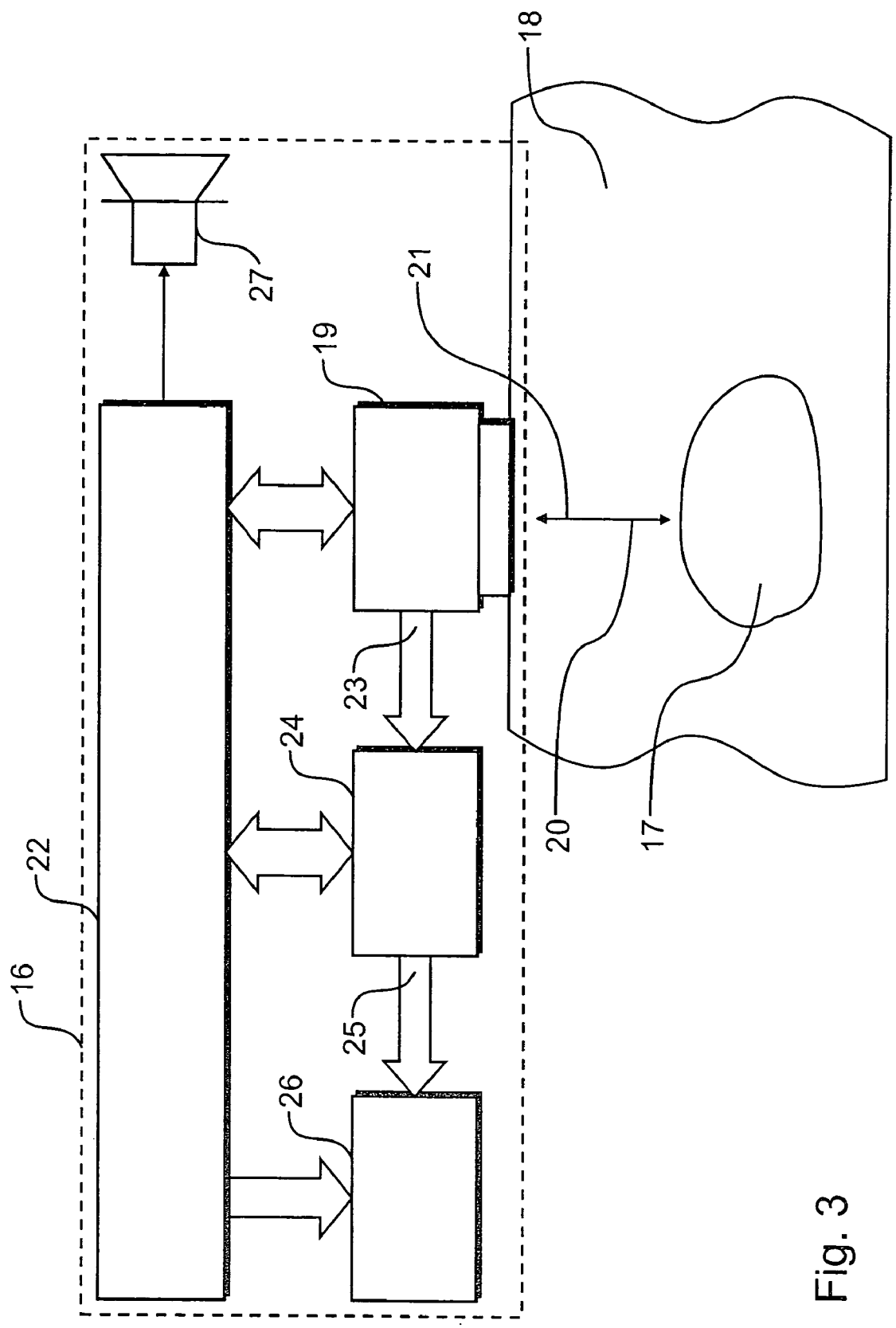
FIG. 3 is a simplified block diagram of a position finder according to the invention.

Finally, FIG. 3 is a simplified block diagram of a position finder 16 according to the invention, that has a largely conventional design and will therefore be described only briefly hereinbelow.

The position finder 16 enables the detection of the location of an object 17 in an object under examination, whereby the object under examination 18 can be a building wall, and the object 17 can be a pipe in the building wall, for example.

To accomplish this, the position finder 16 has a position detector 19 that is placed, with a transducer head, on the surface of the object under examination 18 and sends a measurement signal 20 into the object under examination 18. In the object under examination 18, the introduced measurement signal 20 is reflected relatively strongly on the bounding surface of the object 17 to be located. It is then detected as a response signal 21 by the transducer head of the position detector 19.

The position detector 19 and the other components of the position finder 16 are controlled by a central control unit 22 that controls the introduction of the measurement signal 20 and the measurement of the response time.

The position data captured by the position detector 19 are forwarded continually during the measurement via a real-time connection 23 to an evaluation unit 24 that calculates a sectional image through the object under examination 18 using the position data and the measured response times.

This sectional image is reproduced continually during the measurement on an LCD display 26 via a real-time connection 25 by the evaluation unit 24. The LCD display 26 depicts the image section in the manner described hereinabove and illustrated in FIGS. 2a and 2b.

Due to the real-time connections 23, 25 between the position detector 19, the evaluation unit 24 and the LCD display 26, the position finder 16 according to the invention makes it possible for the current position of the current sectional image through the object under examination 18 to be displayed already while scanning is being performed.

Finally, the position finder 16 also has a speaker 27 that can be controlled by the control unit 22 to emit a warning signal. A warning signal of this type can be emitted, for example, when the location detection finds that the object 17 in the object under examination 18 is located very close to the surface, whereby the depth can be less than a specified minimum value.

The embodiment of the invention is not limited to the preferred exemplary embodiments indicated hereinabove. Rather, a number of variants are feasible that also employ the means of achieving the object presented hereinabove in entirely different types of embodiments.

REFERENCE NUMERALS

1 Building wall
2 Water pipe
3 Position detector
4 LCD screen
5 Scanned range
6 Range not yet scanned
7 Baseline
8 Graphic symbol for position finder
9 Center line of the position finder
10 Outer line of the position finder
11 Outer line of the position finder
12 Graphic symbol for object
13 Depth scale
14 Display for unit of measure of the depth scale
15 Hidden surface
16 Position finder
17 Object
18 Object under examination
19 Position detector
20 Measurement signal
21 Response signal
22 Control unit
23 Real-time connection
24 Evaluation unit
25 Real-time connection
26 LCD display
27 Speaker

What is claimed is:

1. A method for graphically displaying a sectional image through a building wall under examination having objects situated therein, whereby a position detector captures data of the objects, the data containing depth information of the objects, the depth information being captured automatically by the position detector, an evaluation unit evaluates the data, the objects are electronically displayed within the sectional image through the building wall on a display, the positions of the objects on the display are related to the depth information of the objects, and, whereby the sectional image through the building wall is displayed together with the objects simultaneously while data acquisition by the position detector is taking place.

2. The method as recited in claim 1, wherein a depth scale is displayed in the sectional image.

3. The method as recited in claim 2, wherein the sectional image contains a display that indicates the unit of measurement of the depth scale.

4. The method as recited in claim 1, wherein the objects to be located are each depicted in the form of standardized symbols.

5. The method as recited in claim 1, wherein the objects to be located are depicted differently in the sectional image depending on their depth.

6. The method as recited in claim 5, wherein the objects are displayed in different colors, depending on their depth.

7. The method as recited in claim 5, wherein the objects are displayed as blinking, depending on their depth.

8. The method as recited in claim 7, wherein a blinking frequency increases with a decrease of the depth of the objects.

9. The method as recited in claim 1, wherein a specified depth value range is stored in the evaluation unit, and a signal is emitted when the depth of an object in the building wall that is detected by the position detector is within the specified value range.

10. The method as recited in claim 1, wherein regions of the object under examination already detected by the position detector and regions of the object under examination not yet detected by the position detector (3, 19) are depicted graphically differently in the sectional image.

11. The method as recited in claim 1, wherein regions of the object under examination that are not detectable because they are hidden by the objects to be located, and regions of the object under examination already detected by the position detector are depicted graphically differently in the sectional image.

12. The method as recited in claim 1, wherein the surface of the building wall is also depicted in the sectional image.

13. The method as recited in claim 1, wherein markings representing a current position of the position detector are also depicted in the sectional image.

14. The method as recited in claim 1, wherein the displayed objects, a surface of the building wall and a depth scale are displayed in the sectional image in fixed positions, while the position detector moves during a scanning function and is displayed in the sectional image as well, always in its current position.

15. The method as recited in claim 1, wherein an object in the object under examination (1, 18) is detected via a position finder (3), wherein the position finder (3) is displayed by means of a graphic symbol (8) and wherein a graphic symbol (12) of the detected object is displayed relatively to the graphic symbol (8) of the position finder (3) in the position that corresponds to its position in the object under examination (1, 18) relative to the position finder (3).

16. The method as recited in claim 15, wherein the graphic symbol (12) of the detected object moves relatively to the graphic symbol (8) of the position finder (3), when the position finder (3) is being moved relatively to the detected object.

17. A position finder for locating objects in a building wall, using a position detector, an evaluation unit connected with the position detector to evaluate position data captured by the position detector, and a graphic display unit, wherein the evaluation unit in combination with the graphic display unit is adapted to reproduce a sectional image through the object under examination with the objects situated therein on the graphic display unit,
wherein the sectional image through the building wall contains depth information about the objects, and the position of the objects on the display are related to the depth information of the objects, and
wherein the position detector, the evaluation unit and the display unit are interconnected via a real-time connection in order to enable instantaneous output of the sectional image through the building wall in accordance with the particular position of the position detector.

18. The position finder as recited in claim 17, wherein the sectional image depicted by the display unit contains a graphic reproduction of the current position of the position detector, the current position of the center line of the position detector, and/or the current position of an outer line of the position detector.

19. The position finder as recited in claim 17, wherein the sectional image depicted by the display unit contains a graphic reproduction of a surface of the object under examination, a depth scale, the unit of measurement of the depth scale, and/or the objects situated in the object under examination.

20. The position finder as recited in claim 17, wherein the specific graphic pattern for the depiction of the objects is provided in the sectional image.

21. The position finder as recited in claim 17, wherein the display unit comprises an LED display, an LCD display, a cathode ray tube, a plasma display, a VFD display, or an OLED display.

22. The position finder as recited in claim 17, characterized by an additional acoustic signal generator for generating an indication signal.

23. The position finder as recited in claim 17, wherein regions of the object under examination already detected by the position detector and regions of the object under examination not yet detected by the position detector are depicted graphically differently in the sectional image.

* * * * *